US011377331B2

United States Patent
Maghsoodi et al.

(10) Patent No.: US 11,377,331 B2
(45) Date of Patent: Jul. 5, 2022

(54) AUTOMATIC LOAD BRAKE HAVING WEAR-INDUCED LOCKING MECHANISM

(71) Applicant: GOODRICH CORPORATION, Charlotte, NC (US)

(72) Inventors: Bejan Maghsoodi, Diamond Bar, CA (US); Zachary Limas, Upland, CA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/369,968

(22) Filed: Mar. 29, 2019

(65) Prior Publication Data

US 2020/0307972 A1   Oct. 1, 2020

(51) Int. Cl.
| | | |
|---|---|---|
| *B66D 5/22* | (2006.01) | |
| *F16D 59/00* | (2006.01) | |
| *F16D 55/38* | (2006.01) | |
| *F16D 121/14* | (2012.01) | |
| *F16D 125/38* | (2012.01) | |

(52) U.S. Cl.
CPC ............... *B66D 5/22* (2013.01); *F16D 55/38* (2013.01); *F16D 59/00* (2013.01); *F16D 2121/14* (2013.01); *F16D 2125/38* (2013.01)

(58) Field of Classification Search
CPC ...... F16D 59/00; F16D 55/38; F16D 2125/38; F16D 2121/14; F16D 55/46; B66D 5/22
See application file for complete search history.

(56) References Cited

U.S. PATENT DOCUMENTS

| | | | |
|---|---|---|---|
| 2,997,146 A | | 8/1961 | Chiolerio |
| 3,292,739 A | * | 12/1966 | Ulbing .................. F16D 65/567 188/71.9 |
| 3,572,482 A | | 3/1971 | Kalpas et al. |
| 4,046,235 A | * | 9/1977 | Shutt ........................ B66D 5/22 188/134 |
| 4,258,832 A | * | 3/1981 | Thorp ..................... B66B 5/048 188/184 |

(Continued)

FOREIGN PATENT DOCUMENTS

| | | |
|---|---|---|
| EP | 64080 | 5/1988 |
| EP | 3369692 | 9/2018 |

OTHER PUBLICATIONS

European Patent Office, European Search Report dated Jun. 23, 2020 in Application No. 19214936.7.

*Primary Examiner* — Melody M Burch
(74) *Attorney, Agent, or Firm* — Snell & Wilmer L.L.P.

(57) ABSTRACT

An automatic load brake having a wear-induced locking mechanism for a hoist is disclosed. In various embodiments, the load brake includes a first shaft defining an annular hollow portion and a radially outer surface; a second shaft defining an engagement portion and a radially inner surface, the radially inner surface configured to engage the radially outer surface; a first reaction plate coupled to the first shaft; a second reaction plate coupled to the second shaft; and a plurality of friction discs, with at least one of the plurality of friction discs coupled to a cup and disposed between the first reaction plate and the second reaction plate, the annular hollow portion of the first shaft being configured to lock to the engagement portion of the second shaft upon thinning of the plurality of friction discs.

20 Claims, 5 Drawing Sheets

(56) References Cited

U.S. PATENT DOCUMENTS

| | | | |
|---|---|---|---|
| 4,518,153 A | 5/1985 | West et al. | |
| 7,575,099 B2 * | 8/2009 | Oh | B66B 5/06 187/247 |
| 2005/0242333 A1 * | 11/2005 | Peterson | B66D 5/22 254/368 |
| 2010/0252132 A1 * | 10/2010 | Neff | F16K 11/07 137/625.17 |
| 2020/0309216 A1 * | 10/2020 | Maghoodi | F16D 55/36 |

\* cited by examiner

AUTOMATIC LOAD BRAKE HAVING WEAR-INDUCED LOCKING MECHANISM

FIELD

The present disclosure relates generally to hoists and, more particularly, to hoists having automatic load brake mechanisms.

BACKGROUND

Hoists used in rescue or related equipment typically wind or unwind a cable in order to raise or lower persons or cargo from a platform. For example, a rescue hoist may be mounted to a frame of an aircraft, such as a helicopter. The rescue hoist may include a cable drum to which a cable is attached. The cable drum rotates in one direction to spool the cable onto the drum and in the other direction to spool the cable off the drum, with one end of the cable attached to the cable drum and the other end, which may include a hook or other device, freely deployed. The hoist typically includes a gear reduction mechanism disposed between a motor and the cable drum to provide a desired rotational speed of the cable drum during operation. The gear reduction mechanism typically includes several shafts arranged to induce large torques or radial loads, thus necessitating robust bearings and other supporting components within the hoist. A load brake may be incorporated into the hoist to control operation of the cable drum during the raising or lowering of loads via the cable.

SUMMARY

An automatic load brake having a wear-induced locking mechanism for a hoist is disclosed. In various embodiments, the load brake includes a first shaft defining an annular hollow portion and a radially outer surface; a second shaft defining an engagement portion and a radially inner surface, the radially inner surface configured to engage the radially outer surface; a first reaction plate coupled to the first shaft; a second reaction plate coupled to the second shaft; and a plurality of friction discs, with at least one of the plurality of friction discs coupled to a cup and disposed between the first reaction plate and the second reaction plate, the annular hollow portion of the first shaft being configured to lock to the engagement portion of the second shaft upon thinning of the plurality of friction discs.

In various embodiments, the radially outer surface is oriented at a first angle with respect to a longitudinal axis extending through the load brake. In various embodiments, the radially inner surface is oriented at a second angle with respect to the longitudinal axis. In various embodiments, the first angle is within a tolerance of about one degree to about three degrees of the second angle. In various embodiments, the first angle equals the second angle. In various embodiments, a tangent of the first angle is equal to or less than a coefficient of friction between the radially outer surface and the radially inner surface when the radially outer surface is engaged with the radially inner surface. In various embodiments, the first angle is less than or equal to about seven degrees.

In various embodiments, the cup is coupled to a sprag clutch. In various embodiments, the second shaft is coupled to a ring gear configured to be driven by a motor. In various embodiments, the first shaft is coupled to an output shaft configured to drive a cable drum. In various embodiments, the radially outer surface is oriented at a first angle with respect to a longitudinal axis extending through the load brake, the radially inner surface is oriented at a second angle with respect to the longitudinal axis and the first angle is within a tolerance of about one degree to about three degrees of the second angle. In various embodiments, a tangent of at least one of the first angle and the second angle is equal to or less than a coefficient of friction between the radially outer surface and the radially inner surface when the radially outer surface is engaged with the radially inner surface.

A drive train for a hoist having an automatic load brake and a wear-induced locking mechanism is disclosed. In various embodiments, the drive train includes a housing; an output shaft rotatably disposed within the housing and configured to rotate a cable drum, the output shaft defining an annular hollow portion and a radially outer surface, the output shaft configured to translate axially along a longitudinal axis; a driving shaft rotatably disposed within the housing and defining an engagement portion and a radially inner surface, the radially inner surface configured to engage the radially outer surface; a cup rotatably disposed within the housing; a first reaction plate connected to the output shaft; a second reaction plate connected to the driving shaft; and a friction disc connected to the cup and disposed between the first reaction plate and the second reaction plate.

In various embodiments, the driving shaft is coupled to a ring gear configured to be driven by a motor. In various embodiments, the radially outer surface is oriented at a first angle with respect to the longitudinal axis, the radially inner surface is oriented at a second angle with respect to the longitudinal axis and the first angle is within a tolerance of about one degree to about three degrees of the second angle. In various embodiments, a tangent of at least one of the first angle and the second angle is equal to or less than a coefficient of friction between the radially outer surface and the radially inner surface when the radially outer surface is engaged with the radially inner surface. In various embodiments, the friction disc includes a first wear surface and a second wear surface and the radially outer surface is configured to engage the radially inner surface following thinning of the first wear surface and the second wear surface.

A method of braking a hoist having an automatic load brake and a wear-induced locking mechanism is disclosed. In various embodiments, the method includes the steps of: operating the hoist having a first shaft defining an annular hollow portion and a radially outer surface in axial alignment with a second shaft defining an engagement portion and a radially inner surface, the radially inner surface configured to engage the radially outer surface; and urging the first shaft toward the second shaft, such that the radially inner surface engages the radially outer surface upon thinning of a plurality of friction discs, with at least one of the plurality of friction discs coupled to a cup and disposed between a first reaction plate coupled to the first shaft and a second reaction plate coupled to the second shaft, such that the radially inner surface frictionally engages and locks with the radially outer surface upon thinning of the plurality of friction discs.

In various embodiments, the cup is coupled to a sprag clutch, the second shaft is coupled to a ring gear configured to be driven by a motor and the first shaft is coupled to an output shaft configured to drive a cable drum. In various embodiments, the radially outer surface is oriented at a first angle with respect to a longitudinal axis extending through the automatic load brake, the radially inner surface is oriented at a second angle with respect to the longitudinal axis and a tangent of the first angle is equal to or less than a coefficient of friction between the radially outer surface and the radially inner surface when the radially outer surface is engaged with the radially inner surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
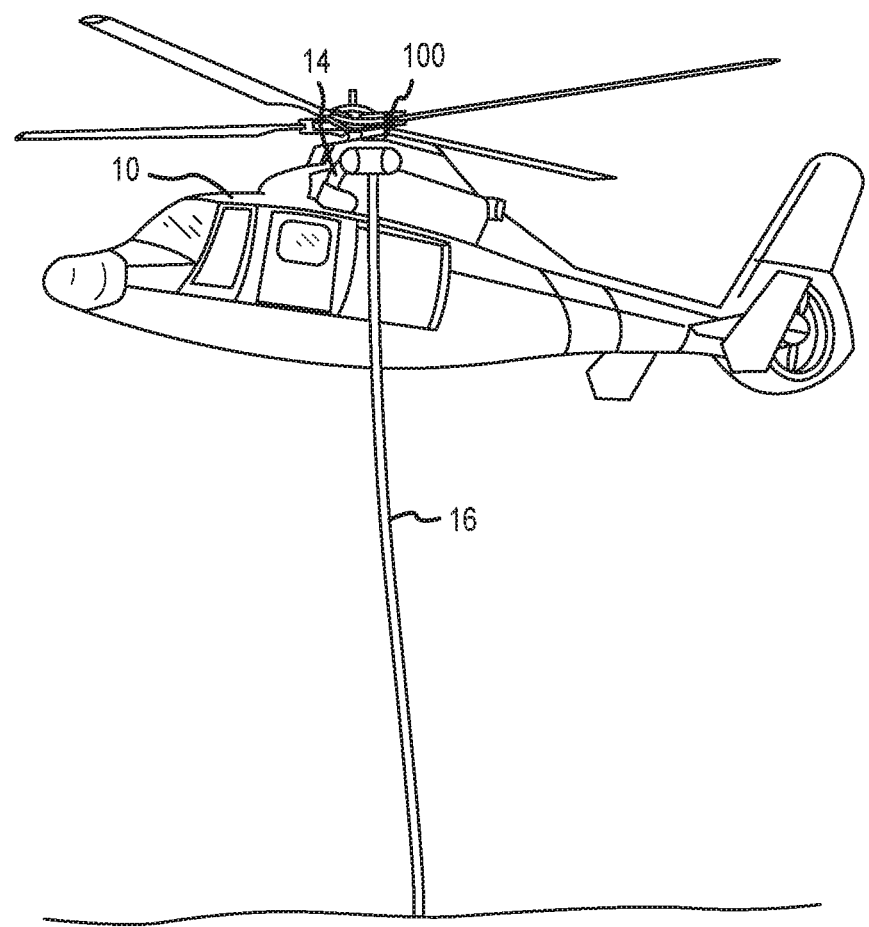
FIG. 1A is an elevation view of an aircraft and a hoist, in accordance with various embodiments.
Figure 1B:
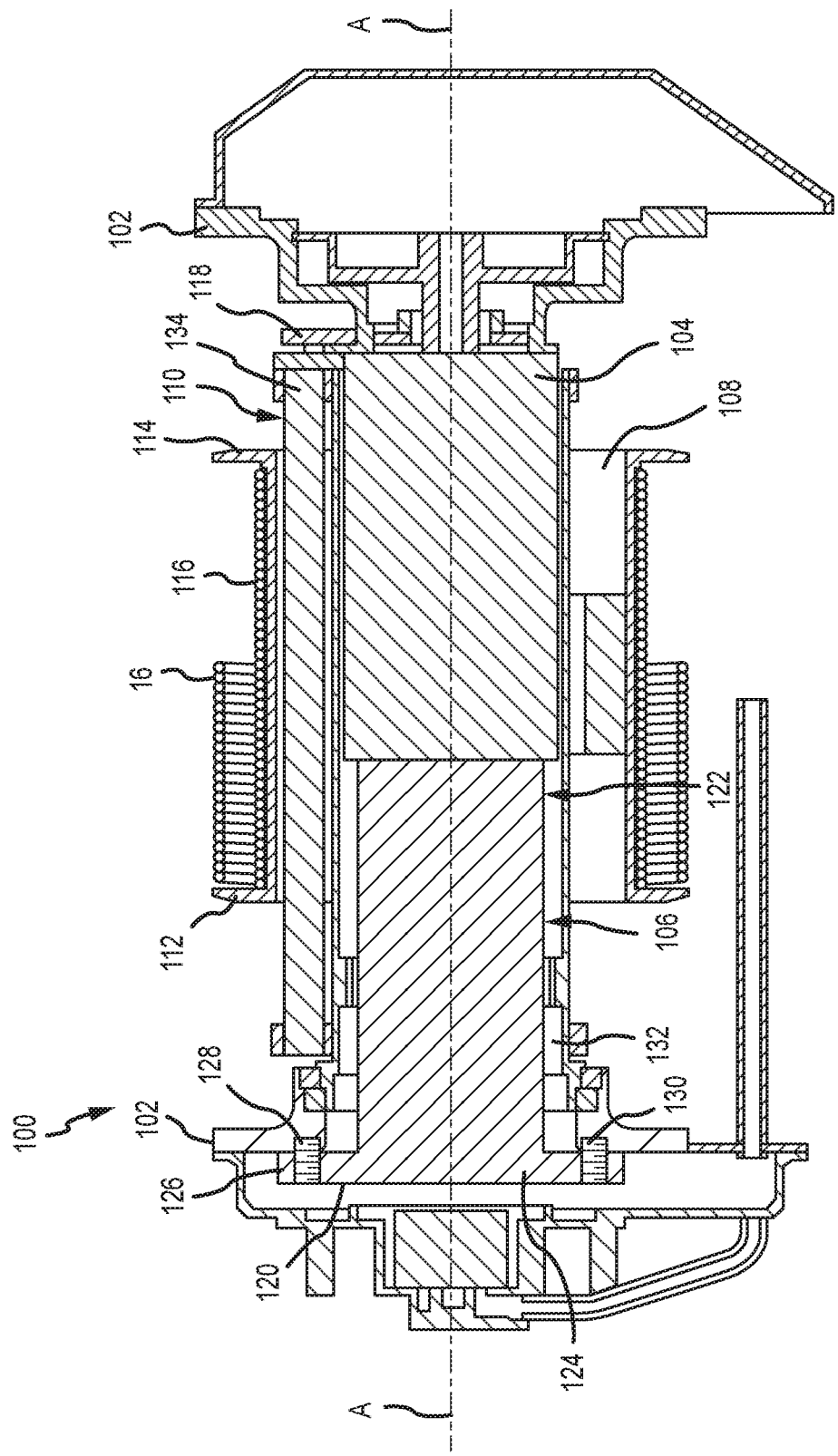
FIG. 1B is a cross-sectional view of a hoist, in accordance with various embodiments.

Referring now to the drawings, FIG. 1A provides a perspective view of an aircraft 10 and a rescue hoist 100 mounted to the aircraft 10, while FIG. 1B provides a cross-sectional view of the rescue hoist 100. The rescue hoist 100 is mounted to the aircraft 10 by a support frame 14 and a cable 16 extends from the rescue hoist 100. In various embodiments, the rescue hoist 100 includes a frame 102, a motor 104, a drive train 106, a cable drum 108 and a level wind mechanism 110. The cable drum 108 includes a first flange 112, a second flange 114 and a barrel 116. The barrel 116 extends between and connects the first flange 112 and the second flange 114. The level wind mechanism 110 includes a level wind gear 118 and a screw 134. The drive train 106 includes a housing 120. The housing 120 includes a first end 122 and a second end 124, with the second end 124 including a mounting flange 126 (or a plurality thereof).

The mounting flange 126 may include a fastener opening 128 and an alignment opening 130. The rescue hoist 100 is mounted to the aircraft 10 by the support frame 14. The cable 16 extends from the rescue hoist 100 and is configured to raise and lower objects to and from the aircraft 10. A bearing system 132, such as, for example, a linear bearing, is rotatably mounted to the frame 102. The motor 104 is connected to the frame 102 and is configured to operate the drive train 106, which is configured to transmit rotational power from the motor 104 to the cable drum 108. The level wind mechanism 110 extends through cable drum 108 and is configured to wrap the cable 16 around the barrel 116 between the first flange 112 and the second flange 114. The level wind mechanism 110 is coupled to the motor 104 and configured to translate the cable drum 108 back and forth along a direction defined by a longitudinal axis A via the screw 134.

Figure 2:
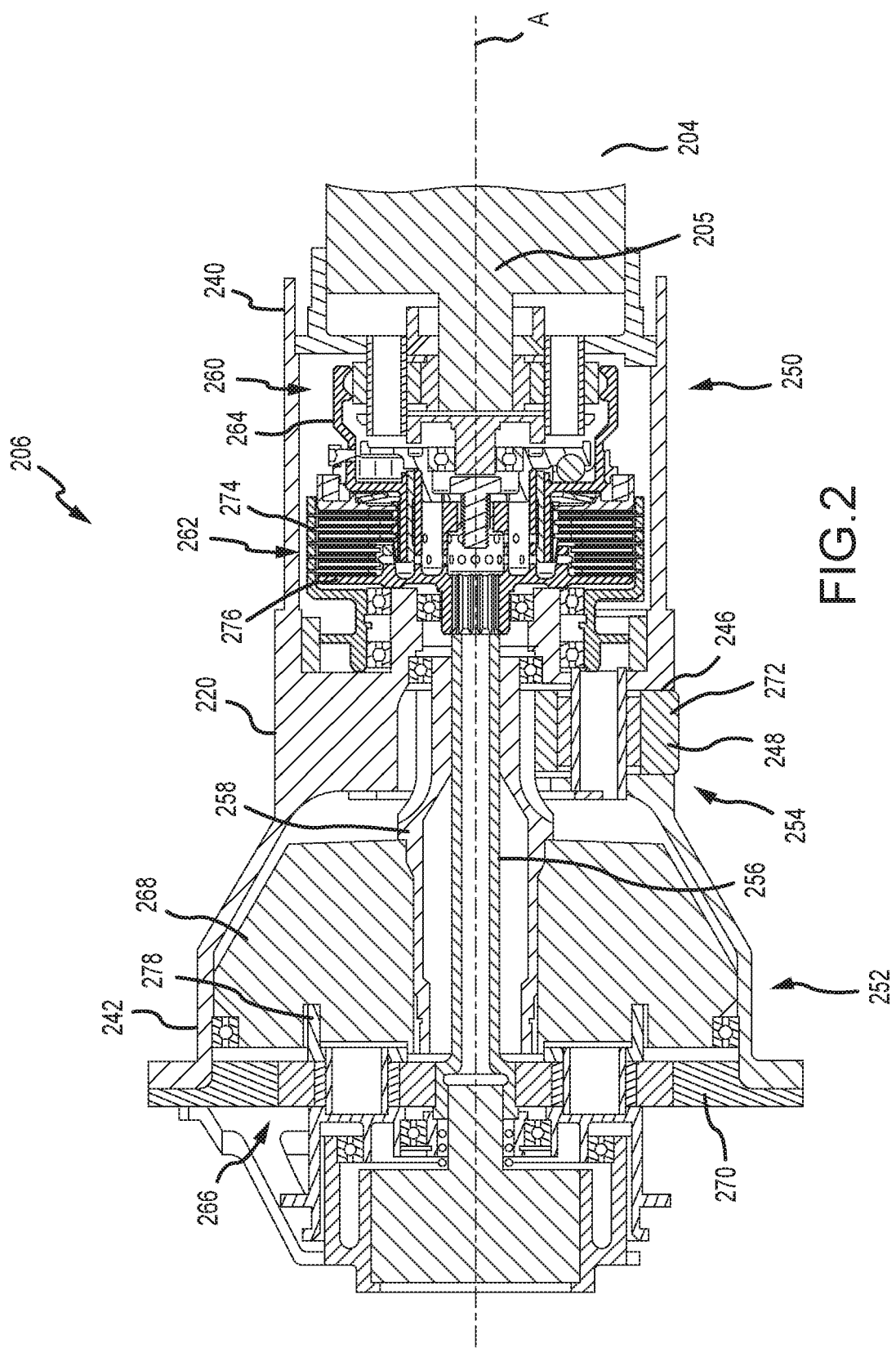
FIG. 2 is a cross sectional view of a drive train of a hoist, in accordance with various embodiments.

Referring now to FIG. 2, a cross-sectional view of a drive train 206 used to power a hoist is provided. The drive train 206 is similar to the drive train 106 used to power the rescue hoist 100, described above with reference to FIG. 1B. In various embodiments, the drive train 106 includes a housing 220, which includes a first end 240, a second end 242 and one or more drive slots 246, through which one or more planetary gears 248 may protrude to drive a cable drum, such as, for example, the cable drum 108 described above with reference to FIG. 1B. In various embodiments, the drive train 206 may include several stages and shaft, such as, for example, a first stage 250, a second stage 252, a third stage 254, a first transmission shaft 256 and a second transmission shaft 258. The first stage 250 includes a first epicyclic gear system 260 and a load brake 262. The first epicyclic gear system 260 includes a first set of planetary gears housed within a first ring gear 264. The second stage 252 includes a second epicyclic gear system 266 and an overload clutch 268. The second epicyclic gear system 266 includes a second set of planetary gears housed within a second ring gear 270. The third stage 254 includes a third set of planetary gears 272 (e.g., the one or more planetary gears 248) configured to drive the cable drum. The load brake 262 includes a brake disc pack 274 and an output shaft 276. The overload clutch 268 includes a clutch input 278 connected to the second epicyclic gear system 266. In various embodiments, the overload clutch 268 is configured to slip when a load on a cable, such as, for example, the cable 16 described above with reference to FIGS. 1A and 1B, reaches a set point that is greater than a rated load of the hoist, thereby decoupling the second transmission shaft 258 from the second stage 252, the first transmission shaft 256, the load brake 262, the first stage 250 and the motor 204. As such, the excess load on the cable is prevented from being transmitted to the motor 204 by overload clutch 268, thereby providing overload protection.

In operation, a motor shaft 205 of a motor 204 is configured to mesh with the first epicyclic gear system 260 to drive the first ring gear 264. The first ring gear 264 is connected to and, subsequently, drives the load brake 262. In various embodiments, the load brake 262 is configured to create a proportional clamping force across the brake disc pack 274 in response to tension created by a load on the cable. The load brake 262 prevents slippage of the cable through the proportional clamping of the brake disc pack 274 and thereby facilitates a smooth lowering motion for the cable. The load brake 262 thus assists in controlling the speed at which the cable is lowered by the drive train 206. The load brake 262 also resists movement of the cable when the motor 204 is not activated. In various embodiments, the first stage 250 provides a speed reduction between the motor 204 and the second stage 252 and, as such, the load brake 262 rotates one stage slower than motor 204. The output shaft 276 of the load brake 262 is connected to the first transmission shaft 256 which, in turn, provides power to the second stage 252 and, subsequently, to the third stage 254 via the second transmission shaft 258, thereby driving the cable drum via the third set of planetary gears 272 (or the one or more planetary gears 248).

Figure 3A:
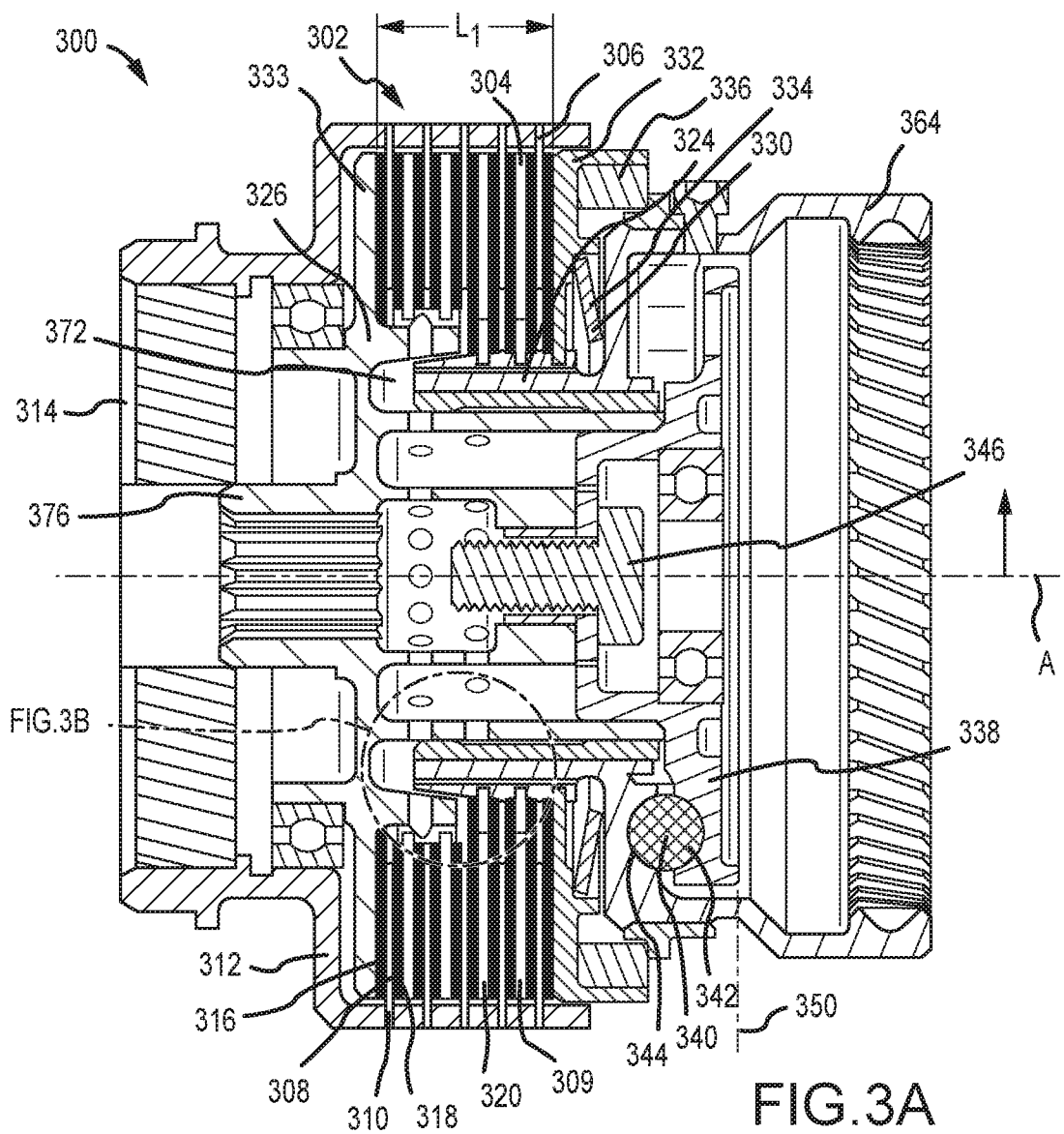
FIGS. 3A and 3B are cross sectional views of a load brake mechanism, in accordance with various embodiments.
Figure 3B:
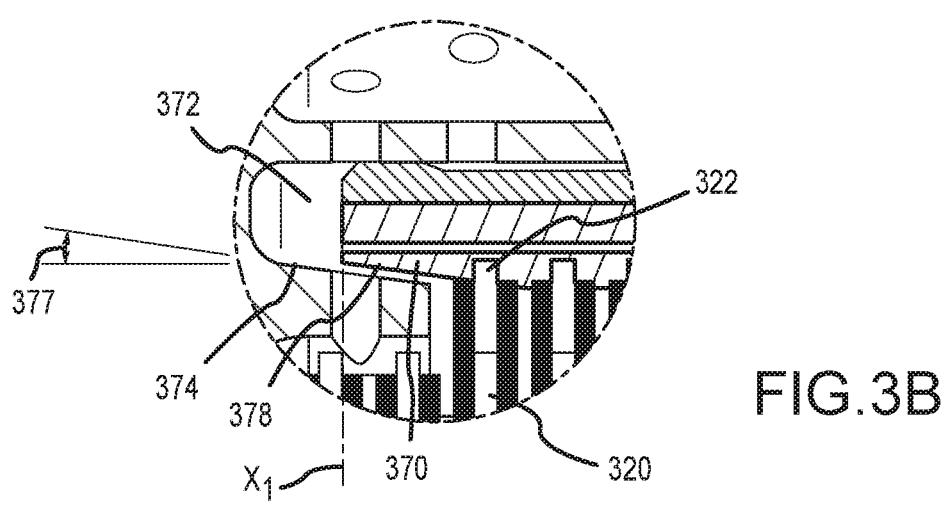
Figure 3C:
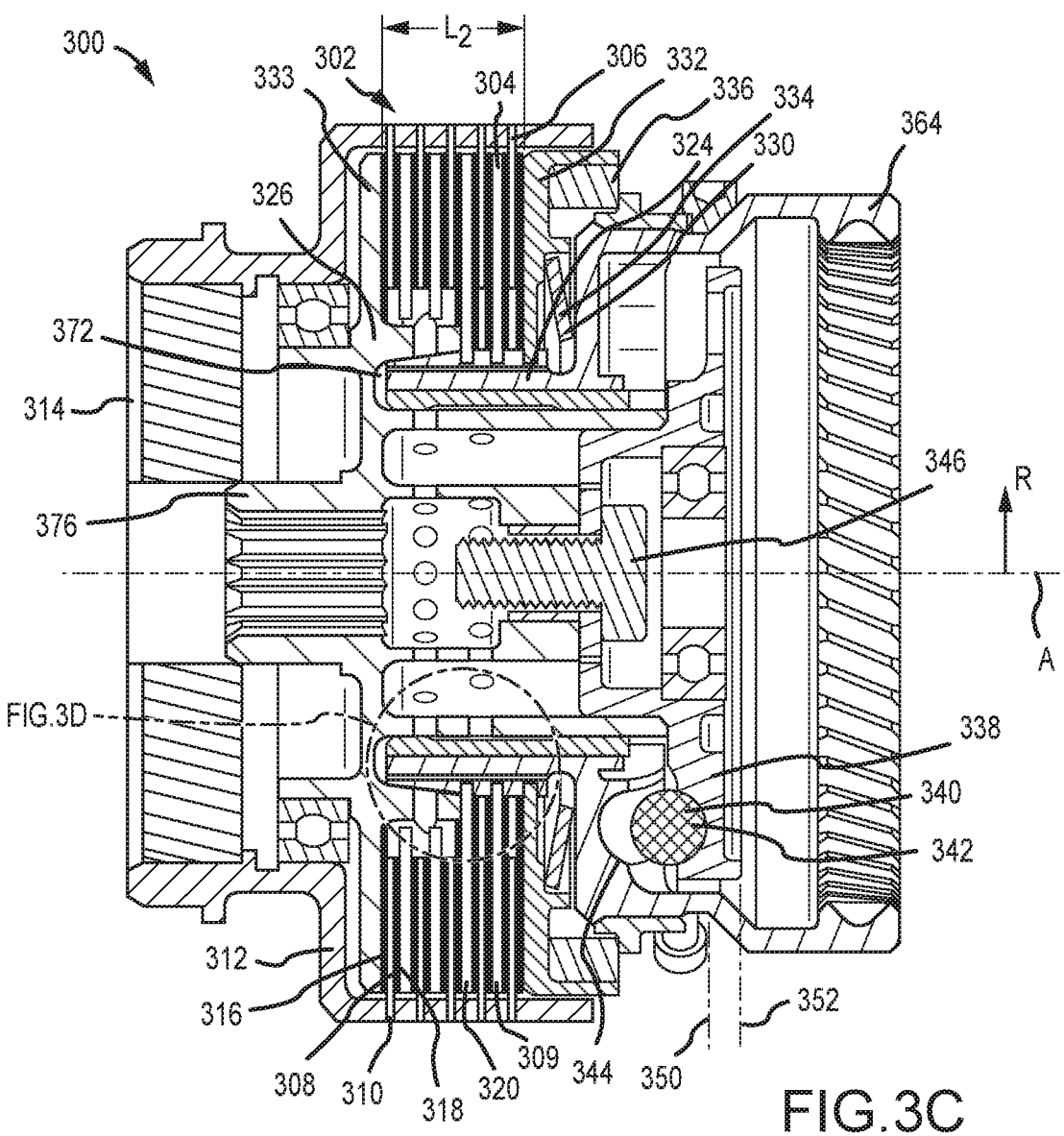
FIGS. 3C and 3D are cross sectional views of a load brake mechanism, in accordance with various embodiments.
Figure 3D:
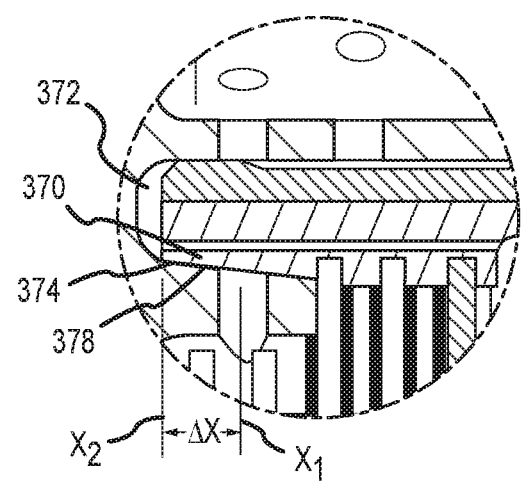

Referring now to FIGS. 3A, 3B, 3C and 3D, details of a load brake 300, similar to the load brake 262 described above with reference to FIG. 2, are provided. In various embodiments, the load brake 300 includes a brake disc pack 302, comprising a plurality of reaction plates 304 and a plurality of friction discs 306. In various embodiments, each of the plurality of friction discs 306 (e.g., a first friction disc 308) includes a radially outward end 310 that is splined to a cup 312. In various embodiments, the cup 312 extends annularly about the brake disc pack 302 and may be coupled to a sprag clutch 314 configured for one-way rotation. Each of the plurality of friction discs 306 (e.g., the first friction disc 308) includes a first wear surface 316 disposed on one side of the friction disc and a second wear surface 318 disposed on the opposite side of the friction disc. A one of the plurality of reaction plates 304 (e.g., a first reaction plate 320) is disposed between adjacent pairs of the plurality of friction discs 306. Each one of the plurality of reaction plates 304 (e.g., the first reaction plate 320) includes a radially inner end 322 that is splined to one of a driving shaft 324 or a driven shaft 326, either of which may, in various embodiments, be referred to as a first shaft or a second shaft. As illustrated in FIG. 3A, a first subset of the plurality of reaction plates 304 (e.g., the first reaction plate 320) may be splined to the driven shaft 326, while a second subset of the plurality of reaction plates 304 (e.g., a second reaction plate 309) may be splined to the driving shaft 324. In various embodiments, the driving shaft 324 may comprise or be coupled to a first ring gear 364, such as, for example, the first ring gear 264 described above with reference to FIG. 2, while the driven shaft 326 may comprise or be coupled to an output shaft 376, such as, for example, the output shaft 276, also described above with reference to FIG. 2.

In various embodiments, a first bias element 330 is configured to provide an axial load against a first pressure plate 332, which, in turn, provides an axial load within the brake disc pack 302. The first bias element 330 may comprise a spring, such as, for example, a Belleville spring 334. In various embodiments, a second bias element 336 is configured to provide a preload (or an axial preload) within the brake disc pack 302 via the first pressure plate 332. A ball ramp assembly 340 may operatively couples the first ring gear 364 to the output shaft 376 via a plate 338 and be configured to adjust the axial load that exists within the brake disc pack 302. In various embodiments, the ball ramp assembly 340 comprises a ball 342 configured to slide or roll on a ramp 344 disposed on an interior surface of the first ring gear 364. The ball 342 slides or rolls on the ramp 344 when there is relative rotary motion between the first ring gear 364 and the plate 338, which drives the plate 338 in an axial direction away from the brake disc pack 302. The plate 338 is connected to the output shaft 376, such that the plate 338 and the output shaft 376 are configured to rotate about and translate along a longitudinal axis A as a single unit. In various embodiments, the plate 338 and the output shaft 376 are connected to one another by a center bolt 346.

During operation, a motor (e.g., the motor 204 described above with reference to FIG. 2) rotates the first ring gear 364 in either a reel-in direction or a reel-out direction. The cable may be loaded or unloaded in either direction, which changes the operation of the hoist. For example, when operating in the reel-in direction, with no load on the cable (i.e., with no back-driving torque applied to the output shaft 376), the ball ramp assembly 340 assumes a relieved configuration, whereby the plate 338 is disposed at a first axial position 350 with respect to the longitudinal axis A. In this configuration, the cup 312, the brake disc pack 302, the plate 338 and the output shaft 376 all rotate as a unit. When operating in the reel-out direction, with no load on the cable, the cup 312 is grounded by the sprag clutch 314, thereby locking the plurality of friction discs 306 in place. In this mode of operation, the motor provides sufficient torque to the first ring gear 364 to slip the plurality of reaction plates 304 with respect to the plurality of friction discs 306, thereby driving the cable off the cable drum.

Conversely, when operating in the reel-in direction or the reel-out direction, with a load on the cable, a back-driving torque is applied to the output shaft 376, causing the shaft and the plate 338 to rotate relative to the first ring gear 364. The relative rotation between the plate 338 and the first ring gear 364 causes the ball 342 to slide or roll on the ramp 344 disposed on an interior surface of the first ring gear 364, thereby affecting axial translation of the plate 338, together with the output shaft 376, to a second axial position 352 (see, e.g., FIG. 3C) with respect to the longitudinal axis A. Translation of the output shaft 376 causes a second pressure plate 333 to translate toward the first pressure plate 332, thereby clamping together the plurality of reaction plates 304 and the plurality of friction discs 306 and locking the brake disc pack 302. The locking of the brake disc pack 302 provides the automatic braking feature of the hoist, locking the cable drum from rotating. The greater the load on the cable, the greater the axial load applied to the brake disc pack 302. In this mode of operation, the motor is required to overcome the torque created by the brake disc pack 302 assuming a locked configuration to either reel in or reel out the cable.

Still referring to FIGS. 3A-3D, over time, the wear surfaces of the brake disc pack 302, e.g., the first wear surface 316 and the second wear surface 318 of the first friction disc 308, will experience thinning due to frictional wear. The combined thinning of the wear surfaces of the plurality of friction discs 306 will cause a first length $L_1$ of the brake disc pack 302 (see, e.g., FIG. 3A) to become reduced by a delta length $\Delta L$ to a second length $L_2$ of the brake disc pack 302 (see, e.g., FIG. 3C), where $\Delta L = L_1 - L_2$. As described below, the load brake 300 is configured to absorb the delta length $\Delta L$, such that the locking of the brake disc pack 302 is not adversely affected by the thinning of the wear surfaces. In various embodiments, for example, as the wear surfaces experience thinning, an engagement portion 370 of the driving shaft 324 is configured to translate an axial distance $\Delta X$, from a first axial position $X_1$ to a second axial position $X_2$, where $\Delta X = X_1 - X_2 = \Delta L$.

To accommodate the thinning wear surfaces, the engagement portion 370 of the driving shaft 324 is configured to slide in an axial direction into an annular hollow portion 372 defined by the driven shaft 326. In various embodiments, the annular hollow portion 372 includes a radially outer surface 374 oriented at an angle 377 with respect to the longitudinal axis A. The engagement portion 370 of the driving shaft 324 likewise includes a radially inner surface 378 that is also oriented at the angle 377 with respect to the longitudinal axis A. As the engagement portion 370 of the driving shaft 324 slides in the axial direction into the annular hollow portion 372, the radially outer surface 374 of the annular hollow portion 372 engages and locks with the radially inner surface 378 of the driving shaft 324 (see, e.g., FIGS. 3C and 3D). In various embodiments, the radially outer surface 374 may be oriented at a first angle with respect to the longitudinal axis A, while the radially inner surface 378 may be oriented at a second angle with respect to the longitudinal axis A. In various embodiments, both the first angle and the second angle are equal to the angle 377, while, in various embodiments, the first angle and the second angle are within a tolerance of about one degree (1°) to about three degrees (3°) of the angle 377.

In various embodiments, the angle 377 may be selected to lock the radially outer surface 374 of the annular hollow portion 372 with the radially inner surface 378 of the driving shaft 324 once the engagement portion 370 of the driving shaft 324 translates the axial distance ΔX into the annular hollow portion 372. For example, the angle 377 may be selected such that the tangent of the angle 377 is less than or equal to the coefficient of friction between the radially outer surface 374 and the radially inner surface 378. In various embodiments, e.g., where the driving shaft 324 and the driven shaft 326 are constructed of steel, the relation between the tangent of the angle 377 and the coefficient of friction is satisfied where the angle 377 is between about one degree (1°) and about ten degrees (10°) or, in various embodiments, between about one degree (1°) and about seven degrees (7°). In various embodiments, the relation is satisfied where the angle 377 is less than or equal to about seven degrees (7°). In various embodiments, the values for the angle 377 provided above fall with a range of plus or minus one degree (±1°). Locking the radially outer surface 374 of the annular hollow portion 372 with the radially inner surface 378 of the driving shaft 324 once the engagement portion 370 of the driving shaft 324 translates the axial distance ΔX into the annular hollow portion 372 provides a self-energizing or self-locking mechanism that prevents the cable from unintended reeling out when the wear surfaces have thinned to a point where the brake disc pack 302 is no longer able to affect the automatic brake load described above during operation of the load brake 300.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An automatic load brake having a wear-induced locking mechanism for a hoist, comprising:
    a first shaft defining an annular hollow portion and a radially outer surface;
    a second shaft defining an engagement portion and a radially inner surface, the radially inner surface configured to engage the radially outer surface;
    a first reaction plate coupled to the first shaft;
    a second reaction plate coupled to the second shaft; and
    a plurality of friction discs coupled to a cup, with at least one of the plurality of friction discs disposed between the first reaction plate and the second reaction plate,
        wherein each of the plurality of friction discs includes a first wear surface disposed on one side of the friction disc and a second wear surface disposed on the opposite side of the friction disc,
        wherein the first shaft and the second shaft are in frictional disengagement prior to the first wear surface of the friction disc and the second wear surface of the friction disc experiencing thinning,
        wherein, in response to the first wear surface of at least one of the plurality of friction discs and the second wear surface of the at least one of the plurality of friction discs experiencing thinning, the engagement portion of the second shaft is configured to translate an axial distance into the annular hollow portion of the first shaft and thereby lock to the engagement portion of the second shaft.

2. The load brake of claim 1, wherein the radially outer surface is oriented at a first angle with respect to a longitudinal axis extending through the load brake.

3. The load brake of claim 2, wherein the radially inner surface is oriented at a second angle with respect to the longitudinal axis.

4. The load brake of claim 3, wherein the first angle is within a tolerance of about one degree to about three degrees of the second angle.

5. The load brake of claim 3, wherein the first angle equals the second angle.

6. The load brake of claim 4, wherein a tangent of the first angle is equal to or less than a coefficient of friction between the radially outer surface and the radially inner surface when the radially outer surface is engaged with the radially inner surface.

7. The load brake of claim 4, wherein the first angle is less than or equal to about seven degrees.

8. The load brake of claim 1, wherein the cup is coupled to a sprag clutch.

9. The load brake of claim 8, wherein the second shaft is coupled to a ring gear configured to be driven by a motor.

10. The load brake of claim 9, wherein the first shaft is coupled to an output shaft configured to drive a cable drum.

11. The load brake of claim 10, wherein the radially outer surface is oriented at a first angle with respect to a longitudinal axis extending through the load brake, the radially inner surface is oriented at a second angle with respect to the longitudinal axis and the first angle is within a tolerance of about one degree to about three degrees of the second angle.

12. The load brake of claim 11, wherein a tangent of at least one of the first angle and the second angle is equal to or less than a coefficient of friction between the radially outer surface and the radially inner surface when the radially outer surface is engaged with the radially inner surface.

13. A drive train for a hoist having an automatic load brake with a wear-induced locking mechanism, comprising:
a housing;
an output shaft rotatably disposed within the housing and configured to rotate a cable drum, the output shaft defining an annular hollow portion and a radially outer surface, the output shaft configured to translate axially along a longitudinal axis;
a driving shaft rotatably disposed within the housing and defining an engagement portion and a radially inner surface, the radially inner surface configured to engage the radially outer surface;
a cup rotatably disposed within the housing;
a first reaction plate connected to the output shaft;
a second reaction plate connected to the driving shaft; and
at least one friction disc connected to the cup and disposed between the first reaction plate and the second reaction plate,
wherein the at least one friction disc comprises a plurality of friction discs includes a first wear surface disposed on one side of the friction disc and a second wear surface disposed on the opposite side of the friction disc,
wherein the first shaft and the second shaft are in frictional disengagement prior to the first wear surface of the friction disc and the second wear surface of the friction disc experiencing thinning,
wherein, in response to the first wear surface of the at least one of the plurality of friction discs and the second wear surface of the at least one of the plurality of friction discs experiencing thinning, the engagement portion of the second shaft is configured to translate an axial distance into the annular hollow portion of the first shaft and thereby lock to the engagement portion of the driving shaft.

14. The drive train of claim 13, wherein the driving shaft is coupled to a ring gear configured to be driven by a motor.

15. The drive train of claim 14, wherein the radially outer surface is oriented at a first angle with respect to the longitudinal axis, the radially inner surface is oriented at a second angle with respect to the longitudinal axis and the first angle is within a tolerance of about one degree to about three degrees of the second angle.

16. The drive train of claim 15, wherein a tangent of at least one of the first angle and the second angle is equal to or less than a coefficient of friction between the radially outer surface and the radially inner surface when the radially outer surface is engaged with the radially inner surface.

17. The drive train of claim 16, wherein the radially outer surface is configured to engage the radially inner surface following thinning of the first wear surface of at least one of the plurality of friction discs and the second wear surface of at least one of the plurality of friction discs.

18. A method of braking a hoist having an automatic load brake with a wear-induced locking mechanism, comprising:
operating the hoist having a first shaft defining an annular hollow portion and a radially outer surface in axial alignment with a second shaft defining an engagement portion and a radially inner surface, the radially inner surface configured to engage the radially outer surface, the first shaft and second shaft being in frictional disengagement; and
urging the first shaft toward the second shaft in response to thinning of a plurality of friction discs, including at least one of the plurality of friction discs coupled to a cup and disposed between a first reaction plate coupled to the first shaft and a second reaction plate coupled to the second shaft, such that the engagement portion of the second shaft is configured to translate an axial distance into the annular hollow portion of the first shaft and thereby lock to the engagement portion of the second shaft.

19. The method of claim 18, wherein the cup is coupled to a sprag clutch, the second shaft is coupled to a ring gear configured to be driven by a motor and the first shaft is coupled to an output shaft configured to drive a cable drum.

20. The method of claim 19, wherein the radially outer surface is oriented at a first angle with respect to a longitudinal axis extending through the automatic load brake, the radially inner surface is oriented at a second angle with respect to the longitudinal axis and a tangent of the first angle is equal to or less than a coefficient of friction between the radially outer surface and the radially inner surface when the radially outer surface is engaged with the radially inner surface.

* * * * *